United States Patent
Indeck et al.

(10) Patent No.: US 7,181,437 B2
(45) Date of Patent: Feb. 20, 2007

(54) ASSOCIATIVE DATABASE SCANNING AND INFORMATION RETRIEVAL

(75) Inventors: Ronald S. Indeck, St. Louis, MO (US); Ron Kaplan Cytron, St. Louis, MO (US); Mark Allen Franklin, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 10/722,691

(22) Filed: Nov. 24, 2003

(65) Prior Publication Data

US 2004/0111392 A1    Jun. 10, 2004

Related U.S. Application Data

(63) Continuation of application No. 09/545,472, filed on Apr. 7, 2000, now Pat. No. 6,711,558.

(51) Int. Cl.
*G06F 17/30* (2006.01)

(52) U.S. Cl. .................. 707/1; 707/3; 707/6; 707/200; 711/1; 711/112

(58) Field of Classification Search .............. 707/1–10, 707/100–104.1, 200–206; 711/103, 111–112, 711/1, 145, 172; 709/214
See application file for complete search history.

(56) References Cited

U.S. PATENT DOCUMENTS

| | | | |
|---|---|---|---|
| 3,601,808 | A | 8/1971 | Vlack |
| 3,611,314 | A | 10/1971 | Pritchard et al. |
| 3,729,712 | A | 4/1973 | Glassman |
| 3,824,375 | A | 7/1974 | Gross et al. |
| 3,848,235 | A | 11/1974 | Lewis et al. |
| 3,906,455 | A | 9/1975 | Houston et al. |

(Continued)

FOREIGN PATENT DOCUMENTS

EP    0 880 088    11/1998

(Continued)

OTHER PUBLICATIONS

Sidhu et al., String Matching on Multicontext FPGAs using Self-Reconfiguration, 1999, ACM, 217-226.*

(Continued)

*Primary Examiner*—Shahid Alam
*Assistant Examiner*—Jean Bolte Fleurantin
(74) *Attorney, Agent, or Firm*—Thomas Coburn, LLP

(57) ABSTRACT

A method and device are disclosed for an associative and approximate, analog or digital scanning of databases that allows for the asynchronous accessing of data from a mass storage medium. The invention includes providing dedicated analog and digital circuitry and decision logic at the mass storage medium level for determining a key identifying the data of interest, continuously comparing the key to a signal generated from a reading of the data from the mass storage medium with an approximate or exact matching circuit to determine a pattern match, determining a correlation value between the key and the data as it is read in a continuous fashion, and determining a match based upon a preselected threshold value for the correlation value. The pattern matching technique eliminates any need to compare data based on its intrinsic structure or value, and instead is based on an analog or digital pattern. The key and data may be either analog or digital. This device and method may be provided as part of a stand-alone computer system, embodied in a network attached storage device, or can otherwise be provided as part of a computer LAN or WAN.

32 Claims, 6 Drawing Sheets

U.S. PATENT DOCUMENTS

| | | | |
|---|---|---|---|
| 4,081,607 A * | 3/1978 | Vitols et al. ................ | 704/237 |
| 4,298,898 A | 11/1981 | Cardot | |
| 4,385,393 A | 5/1983 | Chaure et al. | |
| 4,464,718 A | 8/1984 | Dixon et al. | |
| 4,550,436 A | 10/1985 | Freeman et al. | |
| 4,823,306 A | 4/1989 | Barbic et al. | |
| 4,941,178 A | 7/1990 | Chuang | |
| 5,023,910 A | 6/1991 | Thomson | |
| 5,050,075 A | 9/1991 | Herman et al. | |
| 5,101,424 A | 3/1992 | Clayton et al. | |
| 5,140,692 A | 8/1992 | Morita | |
| 5,163,131 A | 11/1992 | Row et al. | |
| 5,179,626 A | 1/1993 | Thomson | |
| 5,226,165 A | 7/1993 | Martin | |
| 5,243,655 A | 9/1993 | Wang | |
| 5,319,776 A | 6/1994 | Hile et al. | |
| 5,327,521 A | 7/1994 | Savic et al. | |
| 5,339,411 A | 8/1994 | Heaton, Jr. | |
| 5,388,259 A | 2/1995 | Fleischman et al. | |
| 5,396,253 A | 3/1995 | Chia | |
| 5,418,951 A | 5/1995 | Damashek | |
| 5,432,822 A | 7/1995 | Kaewell, Jr. | |
| 5,465,353 A | 11/1995 | Hull et al. | |
| 5,488,725 A | 1/1996 | Turtle et al. | |
| 5,497,488 A | 3/1996 | Akizawa et al. | |
| 5,544,352 A | 8/1996 | Egger | |
| 5,546,578 A | 8/1996 | Takada | |
| 5,651,125 A | 7/1997 | Witt et al. | |
| 5,721,898 A | 2/1998 | Beardsley et al. | |
| 5,774,835 A | 6/1998 | Ozawa | |
| 5,774,839 A | 6/1998 | Shlomot | |
| 5,781,772 A | 7/1998 | Wilkinson, III et al. | |
| 5,819,290 A | 10/1998 | Fujita | |
| 5,864,738 A | 1/1999 | Kessler et al. | |
| 5,913,211 A | 6/1999 | Nitta | |
| 5,930,753 A | 7/1999 | Potamianos et al. | |
| 5,943,421 A | 8/1999 | Grabon | |
| 5,943,429 A | 8/1999 | Händel | |
| 6,070,172 A * | 5/2000 | Lowe ........................ | 707/205 |

FOREIGN PATENT DOCUMENTS

| | | |
|---|---|---|
| EP | 0 887 723 | 12/1998 |
| EP | 0 911 738 A | 4/1999 |
| EP | 0 851 358 A | 7/1999 |
| WO | WO 01/22425 A | 3/2001 |
| WO | WO 01/80082 | 10/2001 |

OTHER PUBLICATIONS

Patent Cooperation Treaty; International Search Report; May 6, 2004.

Arnold et al.; *The Splash 2 Processor and Applications*; Proceedings 1993 IEEE International Conference on Computer Design: VLSI in Computers and Processors; Oct. 3, 1993; pp. 482-485; Cambridge, Massachusetts.

Cloutier et al.; *VIP: An FPGA-Based Processor for Image Processing and Neural Networks*; Proceedings f Fifth International Conference on Microelectronics for Neural Networks; Feb. 12, 1996; pp. 330-336; Los Alamitos, California.

Hezel et al.; *FPGA-Based Template Matching Using Distance Transforms*; Proceedings of the 10th Annual IEEE Symposium on Field-Programmable Custom Computing Machines; Apr. 22, 2002; pp. 89-97; USA.

Mosanya et al.; *A FPGA-Based Hardware Implementation of Generalized Profile Search Using Online Arithmetic*; ACM/SIGDA International Symposium on Field Programmable Gate Arrays; Feb. 21, 1999; pp. 101-111; Monterey, California.

Ratha et al.; *Convolution on Splash 2*; Proceedings of IEEE Symposium on FPGAs for Custom Computing Machines; Apr. 19, 1995; pp. 204-213; Los Alamitos, California.

Shirazi et al.; *Quantitative Analysis of FPGA-Based Database Searching*; Journal of VLSI Signal Processing Systems for Signal, Image, and Video Technology; May 2001; pp. 85-96; vol. 28, No. 1/2; Dordrecht, Netherlands.

Ting-Pang Lin et al.; *Real-Time Image Template Matching Based on Systolic Array Processor*; International Journal of Electronics; Dec. 1, 1992; pp. 1165-1176; vol. 73, No. 6; London, Great Britain.

Villasenor et al.; *Configurable Computing Solutions for Automatic Target Recognition*; Proceedings of IEEE Symposium on FPGAs for Custom Computing Machines; Apr. 17, 1996; pp. 70-79; Los Alamitos, California.

Yamaguchi et al.; *High Speed Homology Search with FPGAs*; Proceedings Pacific Symposium on Biocomputing; Jan. 3, 2002; pp. 271-282; vol. 7; Lihue, Hawaii.

Baer, Jean-Loup; *Computer Systems Architecture*; 1990; pp. 262-265; Computer Science Press; Potomac, Maryland.

Berk, Elliott, "JLex: A lexical analyzer generator for Java™ ", downloaded from http://www.cs.princeton.edu/~appel/modern/java/Jlex/ in Jan. 2002.

Braun et al., "Layered Protocol Wrappers for Internet Packet Processing in Reconfigurable Hardware", *Proceedings of Hot Interconnects 9 (Hotl-9)* Stanford, CA, Aug. 22-24, 2001, pp. 93-98.

Choi et al., "Design of a Flexible Open Platform for High Performance Active Networks", Allerton Conference, Campaign, IL, 1999.

Franklin et al., "Assisting Network Intrusion Detection with Reconfigurable Hardware", Symposium on Field-Programmable Custom Computing Machines (FCCM 2002), Apr. 2002, Napa, California.

Fu et al., The FPX KCPSM Module: An Embedded, Reconfigurable Active Processing Module for the Field Programmable Port Extender (FPX), *Washington University, Department of Computer Science, Technical Report WUCS-01-14*, Jul. 2001.

Hayes, John P.; *Computer Architecture and Organization*: Second Edition; 1988; pp. 448-459; McGraw-Hill, Inc.

Hollaar, Lee A.; *Hardware Systems for Text Information Retrieval*; Proceedings of the Sixth Annual International ACM Sigir Conference on Research and Development in Information Retrieval; Jun. 6-8, 1983; pp. 3-9; Baltimore, Maryland, USA.

Keutzer et al., "A Survey of Programmable Platforms—Network Proc", University of California-Berkeley.

Kulig et al., "System and Method for Controlling Transmission of Data Packets Over an Information Network", pending U.S. Patent Application.

Lockwood, J., "An Open Platform for Development of Network Processing Modules in Reprogrammable Hardware", *IEC DesignCon 2001*, Santa Clara, CA, Jan. 2001, Paper WB-19.

Lockwood, J., "Building Networks with Reprogrammable Hardware", Field Programmable Port Extender: Jan. 2002 Gigabit Workshop Tutorial, *Washington University*, St. Louis, MO, Jan. 3-4, 2002.

Lockwood, J., "Evolvable Internet Hardware Platforms", *NASA/DoD Workshop on Evolvable Hardware (EHW'01)*, Long Beach, CA, Jul. 12-14, 2001, pp. 271-279.

Lockwood, J., "Hardware Laboratory Configuration", Field Programmable Port Extender: Jan. 2002 Gigabit Workshop Tutorial, *Washington University*, St. Louis, MO, Jan. 3-4, 2002.

Lockwood, J., "Introduction", Field Programmable Port Extender: Jan. 2002 Gigabit Workshop Tutorial, *Washington University*, St. Louis, MO, Jan. 3-4, 2002.

Lockwood, J., "Platform and Methodology for Teaching Design of Hardware Modules in Internet Routers and Firewalls", *IEEE Computer Society International Conference on Microelectronic Systems Education (MSE'2001)*, Las V gas, NV, Jun. 17-18, 2001, pp. 56-57.

Lockwood, J., "Protocol Pr cessing on the FPX", Field Programmable P rt Extender: Jan. 2002 Gigabit Workshop Tutorial, *Washington University*, St. Louis, MO, Jan. 3-4, 2002.

Lockwood, J., "Simulation and Synthesis", Field Programmable P rt Extender: Jan. 2002 Gigabit Workshop Tutorial, *Washington University*, St. Louis, MO, Jan. 3-4, 2002.

Lockwood, J., "Simulation of the H llo World Application for the Field-Programmable Port Extender (FPX)", *Washington University, Applied Research Lab*, Spring 2001 Gigabits Kits Workshop.

Lockwood et al., Field Pr grammable Port Extender (FPX) for Distributed Routing and Queuing, *ACM International Symposium on Field Programmable Gate Arrays (FPGA'2000)*, Monterey, CA, Feb. 2000, pp. 137-144.

Lockwood et al., FPGrep and FPSed: Regular Expression Search and Substitution for Packet Streaming in Field Programmable Hardware, unpublished.

Lockwood et al., Hello, World: A Simple Application for the Field Programmable Port Extender (FPX), *Washington University, Department of Computer Science, Technical Report WUCS-00-12*, Jul. 11, 2000.

Lockwood et al., "Parallel FPGA Programming over Backplane Chassis", *Washington University, Department of Computer Sciecne, Technical Report WUCS-00-11*, Jun. 12, 2000.

Lockwood et al., Reprogrammable Network Packet Processing on the Field Programmable Port Extender (FPX), *ACM International Symposium on Field Programmable Gat Arrays (FPGA'2001)*, Monterey, Ca, Feb. 2001, pp. 87-93.

Pramanik et al.; *A Hardware Pattern Matching Algorithm on a Dataflow*, Computer Journal; Jul. 1, 1985; pp. 264-269; vol. 28, No. 3; Oxford University Press, Surrey, Great Britain.

Shah, N., "Understanding Network Process", Version 1.0, University of California-Berkeley, Sep. 4, 2001.

Sidhu et al., "Fast Regular Expression Matching using FPGAs", IEEE Symposium on Field Programmable Custom Computing Machines (FCCM 2001), Apr. 2001.

Sidhu et al., "String Matching on Multicontext FPGAs using Self-Reconfiguration", FPGA '99: Proceedings of the 1999 ACM/SIGDA 7th International Symposium on Field Programmable Gate Arrays, Feb. 1999, pp. 217-226.

Taylor et al., "Generalized RAD Module Interface Specification of the Field Programmable Port Extender (FPX) Version 2", *Washington University, Department of Computer Science, Technical Report*, Jan. 8, 2000.

Taylor et al., "Modular Design Techniques for the FPX", Field Programmable Port Extender: Jan. 2002 Gigabit Workshop Tutorial, *Washington University*, St. Louis, MO, Jan. 3-4, 2002.

"The Field-Programmable Port Extender (FPX)", downloaded from http://www.arl.wustl.edu/arl/ in Mar. 2002.

"Lucent Technologies Delivers "Payload Plus" Network Processors for Programmable, Multi-Protocol, OC-48c Processing", *Lucent Technologies Press Release*, downloaded from http://www.lucent.com/press/1000/0010320.meb.html on Mar. 21, 2002.

"Overview", Field Programmable Port Extender: Jan. 2002 Gigabit Workshop Tutorial, *Washington University*, St. Louis, MO, Jan. 3-4, 2002.

Payload Plus™ Agere System Interface, Agere Systems Product Brief, Jun. 2001, downloaded from Internet, Jan. 2002.

Patent Cooperation Treaty; International Search Report; Jul. 10, 2003.

Patent Cooperation Treaty; International Search Report; Apr. 12, 2005.

Compton et al.; *Configurable Computing: A Survey of Systems and Software*; Technical Report, Northwestern University, Dept. of ECE, 1999.

Schmit; *Incremental Reconfiguration for Pipelined Applications*; Dept. of ECE, Carnegie Mellon University 1997, Pittsburgh, PA.

Anonymous; *Method for Allocating Computer Disk Space to a File of Known Size*, IBM Technical Disclosure Bulletin, vol. 27, No. 10B, Mar. 1, 1985, New York.

Nunez et al.; *The X-MatchLITE FPGA-Based Data Compressor*, Euromicro Conference 1999, Proceedings, Italy, Sep. 8-10, 1999, Los Alamitos, CA.

Gunther et al.; *Assessing Document Relevance with Run-Time Reconfigurable Machines*; FPGAs for custom computing machines, 1996; Proceedings, IEEE Symposium on Napa Valley, CA, Apr. 17, 1996.

Hauck et al.; *Software Technologies for Reconfigurable Systems*, Northwestern University, Dept. of ECE, Technical Report, 1996.

Ebeling et al.; *RaPiD—Reconfigurable Pipelined Datapath*, University of Washington, Dept. of Computer Science and Engineering, Sep. 23, 1996; Seattle, WA.

Pramanik et al.; *A Hardware Pattern Matching Algorithm on a Dataflow*, Computer Journal, Oxford University Press, Jul. 1, 1985; East Lansing, MI.

* cited by examiner

ASSOCIATIVE DATABASE SCANNING AND INFORMATION RETRIEVAL

CROSS REFERENCE TO RELATED APPLICATION

This application is a continuation of U.S. Ser. No. 09/545,472, filed Apr. 7, 2000, now U.S. Pat. No. 6,711,558.

BACKGROUND OF THE INVENTION

Associative memory devices are known in the prior art. Generally, these associative memory devices comprise peripheral memories for computers, computer networks, and the like, which operate asynchronously to the computer, network, etc. and provide increased efficiency for specialized searches. Additionally, it is also known in the prior art that these memory devices can include certain limited decision-making logic as an aid to a main CPU in accessing the peripheral memory. An example of such an associative memory device particularly adapted for use with a rotating memory such as a high speed disk or drum can be found in U.S. Pat. No. 3,906,455, the disclosure of which is incorporated herein by reference. This particular device provides a scheme for use with a rotating memory and teaches that two passes over a memory sector is necessary to presort and then sort the memory prior to performing any logical operations thereon. Thus, this device is taught as not being suitable for use with any linear or serial memory such as magnetic tape or the like.

Other examples of prior art devices may also be found in U.S. Pat. Nos. 3,729,712; 4,464,718; 5,050,075; 5,140,692; and 5,721,898; the disclosures of which are incorporated herein by reference.

As an example, in U.S. Pat. No. 4,464,718, Dixon performs fixed comparisons on a fixed number of bytes. They don't have the ability to scan and correlate arbitrarily over the data. They search serially along the tracks in a given disk cylinder but there is no provision for parallel searching across disks. Dixon's comparisons are limited by a fixed rigid number of standard logical operation types. Additionally, the circuitry presented supports only these single logical operations. There is no support for approximate or fuzzy matching.

While these prior art associative memory devices represent an attempt to speed the input and output of information to and from a peripheral memory, which in many cases is a mass storage memory device, all rely on the classic accessing of data stored in digital form by reading and interpreting the digital either address or content of the memory location. In other words, most such devices access data by its address but there are some devices that take advantage of the power of content addressing as is well known in the art. Nevertheless, in all of the prior art known to the inventors, the digital value of the address or data contained in the addressed location must be read and interpreted in its digital form in order to identify the data and then select it for processing. Not only does it take processing time to read and interpret the digital data represented by the address or content, this necessarily requires that the accessing circuit process the memory according to the structure of the data stored. In other words, if the data is stored in octets, then the accessing circuitry must access the data in octets and process it in an incremental manner. This "start and stop" processing serves to increase the input/output time required to access data. As is also well known in the art, this input/output time typically represents the bottleneck and effective limitation of processing power in any computer or computer network.

In order to solve these and other problems in the prior art, the inventors herein have succeeded in designing and developing a method and apparatus for an associative memory in several embodiments which provide an elegantly simple solution to these prior art limitations as well as dramatically decreased access times for data stored in mass storage memories. As mentioned, the invention has several embodiments each of which has its own advantages.

Generally, the invention may be described as a technique for data retrieval through approximate matching of a data key with a continuous reading of data as stored on a mass storage medium. In its broadest, and perhaps most powerful, embodiment, this key may be an analog signal and it is matched with an analog signal generated by a typical read/write device as it slews across the mass storage medium. In other words, the steps taught to be required in the prior art of not only reading the analog representation of digital data stored on the mass storage medium but also the conversion of that signal to its digital format prior to being compared are eliminated. Furthermore, there is no requirement that the data be "framed" or compared utilizing the structure or format in which the data has been organized and stored. For an analog signal, all that need be specified is the elapsed time of that signal which is used for comparison with a corresponding and continuously changing selected time portion of the "read" signal. Using any one of many standard correlation techniques as known in the prior art, the data "key" may then be approximately matched to the sliding "window" of data signal to determine a match. Significantly, the same amount of data may be scanned much more quickly and data matching the search request may be determined much more quickly as well. For example, the inventors have found that CPU based approximate searches of 200 megabytes of DNA sequences can take up to 10 seconds on a typical present day "high end" system, assuming the offline processing to index the database has already been completed. In that same 10 seconds, the inventors have found that a 10-gigabyte disk could be magnetically searched for approximate matches using the present invention. This represents a 50:1 improvement in performance. Furthermore, in a typical hard disk drive there are four surfaces and corresponding read/write heads, which may be all searched in parallel should each head be equipped with the present invention. As these searches can proceed in parallel, the total increase in speed or improvement represents a 200:1 advantage. Furthermore, additional hard disk drives may be accessed in parallel and scaled to further increase the advantage provided by the present invention.

By choosing an appropriate correlation or matching technique, and by setting an appropriate threshold, the search may be conducted to exactly match the desired signal, or more importantly and perhaps more powerfully, the threshold may be lowered to provide for approximate matching searches. This is generally considered a more powerful search mode in that databases may be scanned to find "hits" which may be valid even though the data may be only approximately that which is being sought. This allows searching to find data that has been corrupted, incorrectly entered data, data which only generally corresponds to a category, as well as other kinds of data searches that are highly desired in many applications. For example, a library of DNA sequences may be desired to be searched and hits found which represent an approximate match to a desired sequence of residues. This ensures that sequences which are close to the desired sequence are found and not discarded but for the difference in a forgivable number of residue mismatches. Still another application involves Internet searches provided by Internet search engines. In such a search, approximate matching allows for misspelled words, differently spelled words, and other variations to be accommodated without defeating a search or requiring a combinatorial number of specialized searches. This technique permits a search engine to provide a greater number of hits for any given search and ensure that a greater number of relevant web pages are found and cataloged in the search.

Still another possible application for the present invention is for accessing databases which may be enormous in size or which may be stored as analog representations. For example, our society has seen the implementation of sound recording devices and their use in many forums including judicial proceedings. In recent history, tape recordings made in the President's oval office have risen in importance with respect to impeachment hearings. As can be appreciated, tape recordings made over the years of a presidency can accumulate into a huge database which might require a number of persons to actually listen to them in order to find instances where particular words are spoken that might be of interest. Utilizing the present invention, an analog representation of that spoken word can be used as a key and sought to be matched while the database is scanned in a continuous manner and at rapid speed. Thus, the present invention provides a powerful search tool for massive analog databases as well as massive digital databases.

While text-based searches are accommodated by the present invention as described above, storage media containing pictures, sound, and other representations have traditionally been more difficult to search than text. The present invention allows searching a large data space for the presence of such content or fragments thereof. For example, the key in this case could be a row or quadrant of pixels that represent the image being sought. Approximate matching of the key's signal can then allow identification of matches or near matches to the key.

While the principal advantages and features of the present invention have been briefly explained above, a more thorough understanding of the invention may be attained by referring to the drawings and description of the preferred embodiment which follow.

DETAILED DESCRIPTION OF THE PREFERRED EMBODIMENT

Figure 1:
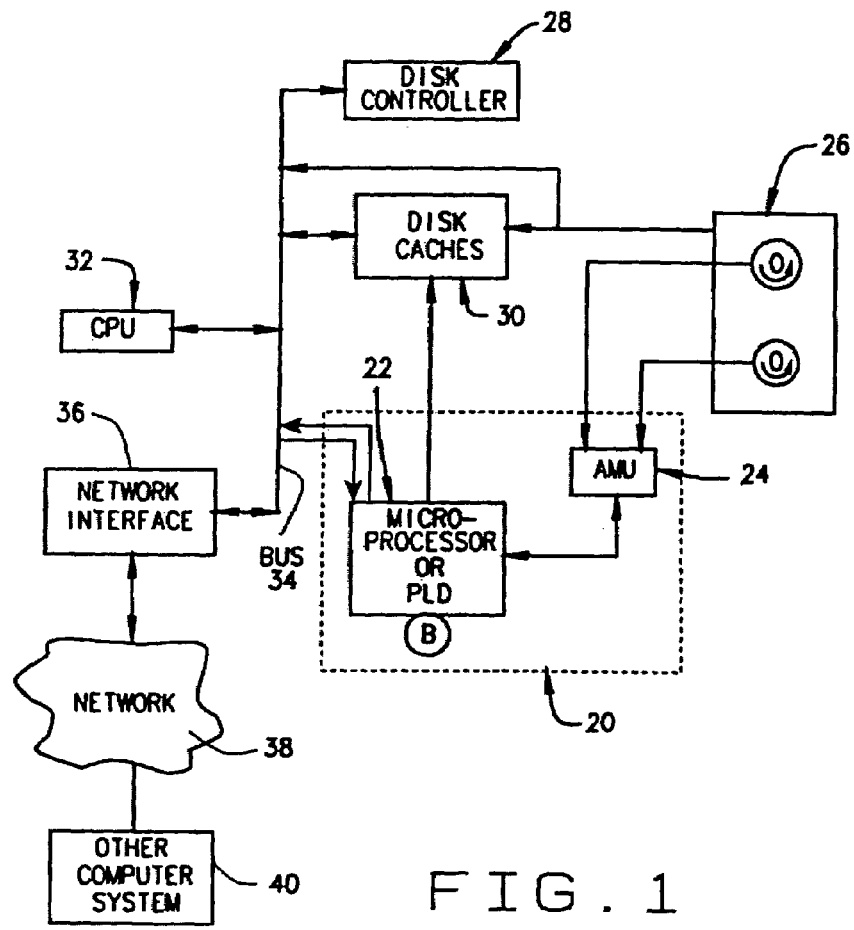
FIG. 1 is a block diagram of a computer having access through its system or input/output bus to the present invention comprising the logical mass storage medium for asynchronous access thereto, as well as a network interface between the present invention and a network to other computer systems.

As shown in FIG. 1, the present invention is readily implemented in a stand-alone computer or computer system. In broad terms, the present invention is comprised of an approximate matching and pre-fetch processor 20 which itself comprises a programmable digital logic device or microprocessor 22 coupled to an approximate matching unit 24. A mass storage medium 26 is connected to the approximate matching unit 24 and provides the medium for storing large amounts of data. The term "mass storage medium" should be understood as meaning any device used to store large amounts of data, and which is typically designated for use in a computer or computer network. Examples include optical systems such as CD ROMS, magnetic systems such as hard disk drives or sub-units such as a single disk surface, and these systems may be rotating, linear, serial, parallel, or various combinations of each. For example, a rack of hard disk drive units could be connected in parallel and their parallel output provided at the transducer level to one or more approximate matching units 24. Similarly, a bank of magnetic tape drives could be used, and their serial outputs each provided in parallel to one or more approximate matching units 24. The data stored on the medium may be in analog or in digital form. For example, the data could be voice recordings as in the tape recording example given above. The present invention is thus scalable, permitting an increase in the amount of data stored in a mass storage system (by increasing the number of parallel storage units) while preserving the performance (by increasing the number of parallel approximate matching units or replicating the approximate matching and prefetch processor).

In the prior art as shown in the upper portion of FIG. 1, typically a disk controller 28 and/or a disk cache 30 may be used in the traditional sense for access by a CPU 32 over its system or input/output bus 34. In the present invention, the approximate matching and pre-fetch processor 20 accesses data in the mass storage medium 26 and presents it for use at the system bus 34 without moving large blocks of memory from the mass storage medium 26 over the system bus 34 and into the main memory (not separately shown) of CPU 32 for sorting and accessing. In other words, as is explained in greater detail below, the CPU 32 sends a data request or query to the approximate matching and pre-fetch processor 20 which then asynchronously accesses and sorts data in the mass storage medium 26 and presents it for use either in a disk cache 30 as is known in the prior art or directly onto the system bus 34 without further processing being required by CPU 32 or use of its main memory. The processor is thus free to perform other tasks while the searching and matching activity is being performed by the present invention.

The approximate matching unit 24 may itself comprise a set of digital logic or analog circuitry organized to perform scanning, correlation, general logic and approximate matching functions on the signals received from the storage medium in conjunction with digital or analog representations of query directed key information. The functions may be performed by dedicated logic and circuitry, programmable logic and circuitry or by use of programmable processors such as digital signal processors (DSPs). The inventors contemplate that many different variations of hardware or programmed software devices may be used to virtually equal advantage in implementing the present invention and therefore do not contemplate any particular implementation as a better mode than another, at present, except as otherwise expressed herein. Furthermore, the present invention should not be considered as being tied to any specific data structure or application, those having been used herein are instead to be viewed as illustrative only. Using the present disclosure as a template, it is contemplated that one of ordinary skill in the art could readily construct a device as would perform the functions and operation necessary to achieve the purposes of the invention.

Figure 1A:
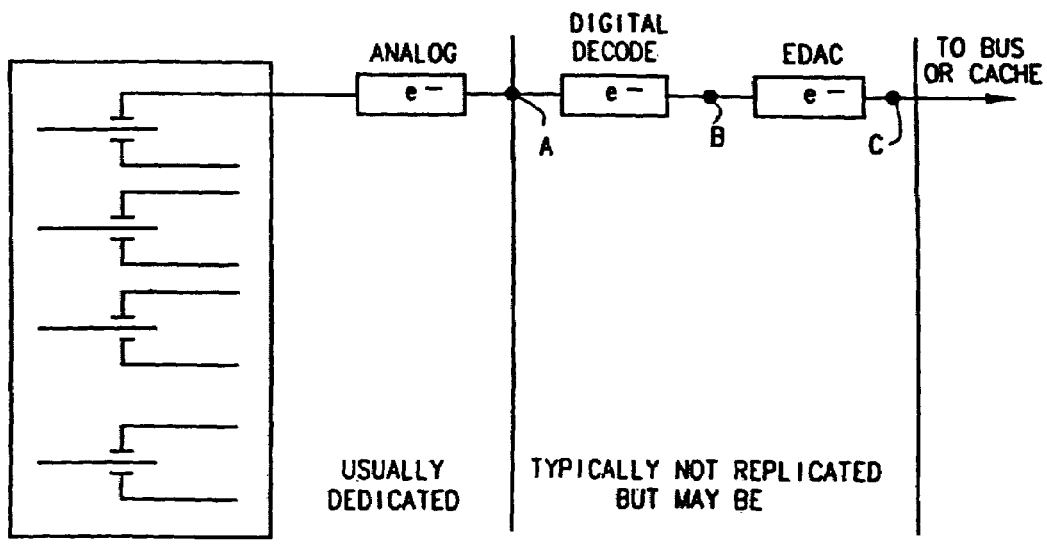
FIG. 1A is a schematic for a conventional rigid disk drive system illustrating different insertion points for connection of the present invention.

As has been explained above, the present invention may be used to perform both exact matches and approximate matches. When performing an exact match in the analog domain, at Point A in FIG. 1A, where matching is done using analog comparators and correlation techniques, there an exact match corresponds to setting a sufficiently high threshold value for matching the key with analog source data on the storage medium. Approximate matching in this analog domain corresponds to setting appropriate (lesser) threshold values. When performing an exact match in the digital domain, an exact match is performed using digital comparators and logic as suggested in current art, where a digital key is compared with digital source data from the storage medium. Such matching could be performed at Point B or Point C, as shown in FIG. 1A, which corresponds to the pre- and post-error-corrected digital signal, respectively. Approximate matching in this domain corresponds to performing comparisons or digital correlation of the digital key with digital source data obtained from the storage medium. The digital key may contain "wild card" or "don't care" digital bits or data formats. The success of an approximate match may be determined by setting a correlation value or by using one of a number of matching-performance metrics such as the number of bits within a key that are equal to the corresponding bits in the scanned source data. Also, note that the data entries identified in an "approximate" match search will include the "exact" hits that would result from an "exact" search. For clarity, when the word "match" is used, the reader should understand that it includes a search or a data result found through either of an approximate search or an exact search. When the phrase "approximate match" or even just "approximate" is used, the reader should understand that it could be either of the two searches described above as approximate searches, or for that matter any other kind of "fuzzy" search that has a big enough net to gather data entries that are loosely related to the search criteria. Of course, an exact match is just that, and does not include any result other than an exact match of the search criteria with a high degree of correlation.

The microprocessor or programmable logic device 22 may itself comprise one or more microprocessors, programmable logic units, dedicated logic and associated circuitry. This unit interfaces with the system or input/output bus 34 and, in one configuration, also interfaces with any disk caches 30 which may be present. The unit receives and processes requests and queries from the CPU 32 or network interface 36 and presents these requests in the appropriate form to approximate matching unit 24. Additionally the unit may aid in passing the results of the requests to either or both the disk cache 30 and/or the CPU 32 (by way of the bus 34).

More particularly, as shown in FIG. 1A, a conventional rigid disk drive may have a plurality of rotating disks with multiple transducers accessing each disk. Each of these transducers typically has its output feeding analog signal electronics, such as amplifiers. This is represented at point A in the Figure. The Approximate Matching and Pre-fetch Processor (AMPP) 20, or the AMU 24, may be installed at point A for analog matching. As further shown in FIG. 1A, typically the outputs of the analog circuitry are selectively provided to a single digital decoder which then processes one such output. This is represented at point B in the Figure. This digital output is typically then sent through error correction circuitry (ECC) and at its output C is then passed on to the bus 34 or disk cache 30. For purposes of the present invention, it may be desirable to provide multiple parallel paths for data by providing multiple digital decoders and ECC's. The Approximate Matching and Pre-fetch Processor (AMPP) 20, or the AMU 24, may be installed at either of points B or C for digital matching, and for multiple data output, multiple AMPP's or AMU's may also be provided.

Also shown in FIG. 1 is a network interface 36 interconnecting the present invention 20, a network 38 which may be a LAN, WAN, Internet, etc. and to which other computer systems 40 may be connected. With this arrangement, other computer systems 40 may conveniently also access the data stored on the mass storage medium 26 through the present invention 20. More specific examples are given below.

Figure 2:
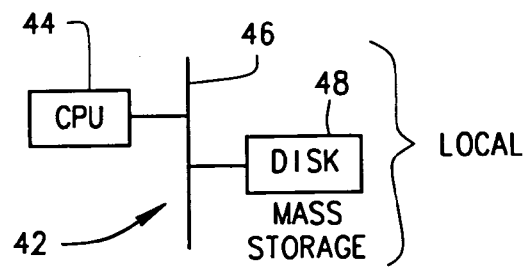
FIG. 2 is a block diagram depicting the implementation of the present invention in a stand-alone configuration.
Figure 3:
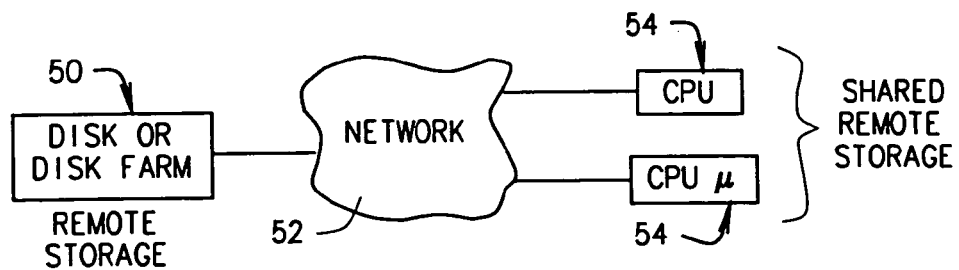
FIG. 3 is a block diagram depicting the present invention implemented as a shared remote mass storage device across a network.
Figure 4:
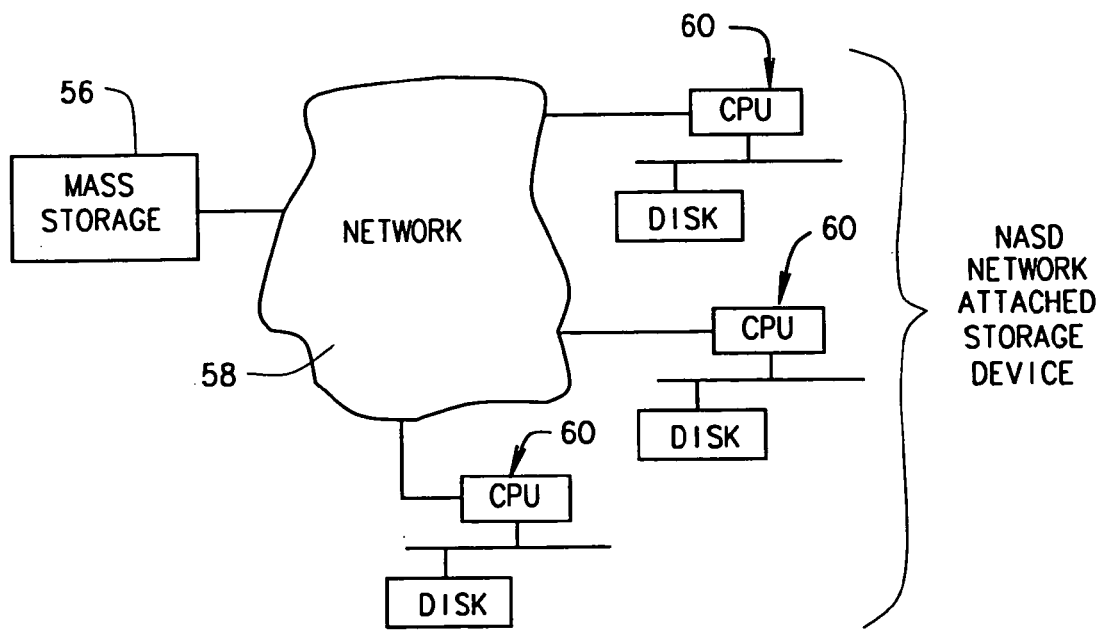
FIG. 4 is a block diagram depicting the present invention as a network attached storage device (NASD)

As shown in FIGS. 2–4, the present invention may be implemented in a variety of computer and network configurations. As shown in FIG. 2, the present invention may be provided as part of a stand-alone computer system 42 comprising a CPU 44 connected to a system bus 46 which then accesses a mass storage medium 48 having the invention as disclosed herein.

As shown in FIG. 3, the mass storage medium 50 coupled with the present invention may be itself connected directly to a network 52 over which a plurality of independent computers or CPU's 54 may then access the intelligent mass storage medium 50. The intelligent mass storage medium 50 may itself be comprised of a bank of hard disk drives comprising a RAID, disk farm, or some other massively parallel memory device configuration to provide access and approximate matching capabilities to enormous amounts of data at significantly reduced access times.

As shown in FIG. 4, an intelligent mass storage medium 56 equipped with the present invention may be connected to a network 58 as a Network Attached Storage Device (NASD) such that over the network 58 a plurality of stand-alone computers 60 may have access thereto. With the configuration as shown in FIG. 4, it is contemplated that each data storage device, represented as a disk in FIG. 4, would be accessible from any processor connected to the network. One such configuration would include assigning a unique IP address or other network address to each data storage medium.

The configurations as exemplified by those shown in FIGS. 2–4 represent only examples of the various computer and network configurations with which the present invention would be compatible and highly useful. Others would be apparent to those having skill in the art and the present invention is not intended to be limited through the examples as shown herein which are meant to be instead illustrative of the versatility of the present invention.

Figure 5A:
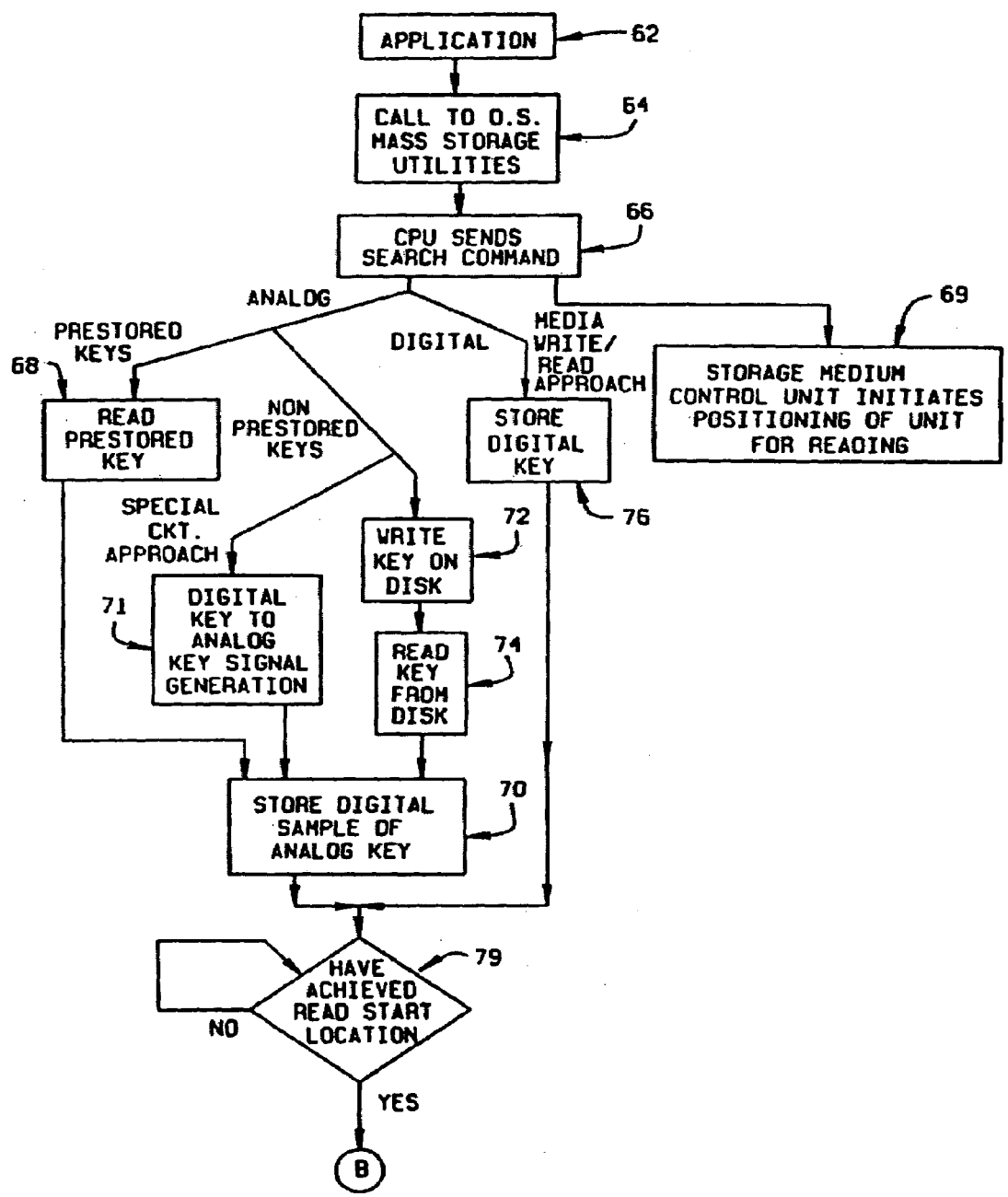
FIG. 5 is a flow chart detailing the logical steps in the inventive method for accessing data in a mass storage medium.
Figure 5B:
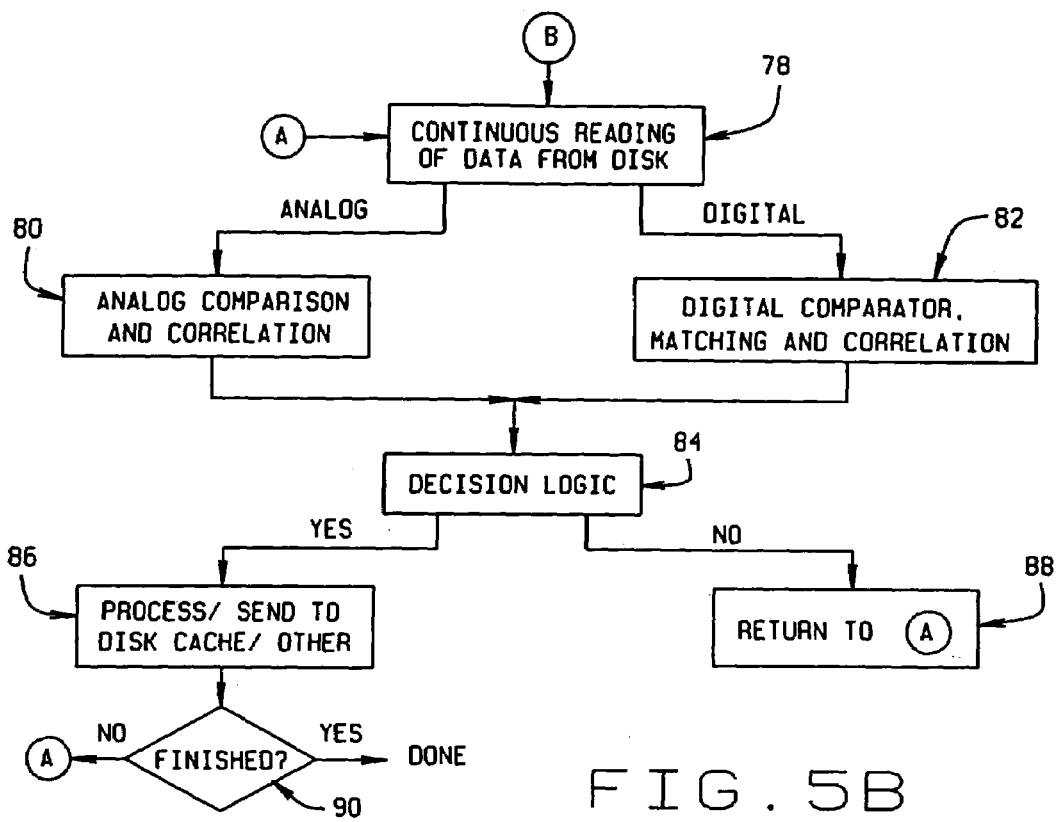

As shown in FIG. 5, the method of the present invention is described alternatively with respect to whether an analog or digital key is used. However, beginning at the start of the method, a CPU performs certain functions during which it may choose to access data stored in a mass storage medium. Typically, the CPU runs an application 62 which may be a DNA search, an Internet search, an analog voice search, a fingerprint search, an image search, or some other such search during which an approximate (or exact) match to data is desired. In executing that higher order language application, the CPU would typically execute a request or query to obtain information from the storage device 26. The query contains directives specifying various parameters which the disk control unit 28 and the approximate matching and prefetch processor 20 must have to properly obtain requested information from the storage device 26. Examples of parameters include but are not limited to the following: the starting location for scanning the storage device; the final location after which (if there is not match) scanning is terminated; the key to be used in the scanning; a specification of the approximate nature of the matching; what information should be returned when a match occurs, etc. The sort of information that can be returned includes the address of the information where the match was found, or a sector, record, portion of record or other data aggregate which contains the matched information. The data aggregate may also be dynamically specified in that the data returned on a match may be specified to be between bounding data specifiers with the matched data contained within the bounding field. For example, looking for the word "terrorist" in a string of text might find the approximate match, due to misspelling, of the word "terrerist", and return a data field which is defined by the surrounding sentence. Another query parameter would indicate whether the returned information should be sent to the system or input/output bus 34, or the disk cache 30.

The query will typically result in the execution of one or more operating system utilities. As an example of a higher level utility command, for the UNIX operating system, this could be modified versions of glimpse, find, grep, apropos. Other such functions causing the CPU to send commands 66 such as search, approximate search, etc., to the approximate matching and pre-fetch processor of the present invention (see FIG. 1) with relevant portions of these commands also being sent to the disk controller 28 to, for example, initiate any mass storage media positioning activity 69 that is later required for properly reading information from the media.

At this point, depending upon the particular methodology desired to be implemented in the particular embodiment of the invention, it would be necessary that an analog or digital key is determined. This key is data, exact or approximate, that corresponds to the data being searched for. For an analog key, this key may either be pre-stored such as in the mass storage medium, developed using dedicated circuitry, or required to be generated. Should the analog key be pre-stored, a send pre-stored key step 68 would be performed by the microprocessor or programmable logic device 22 (see FIG. 1) which would transmit the key in digital and sampled format to the approximate matching unit 24 as shown in step 70. Alternatively, should the analog key not be pre-stored, the analog key can be developed using one of a number of mechanisms, two of which are shown in FIG. 5. In one the microprocessor 22 would write the key on the magnetic medium as at step 72 and then next read the key as at step 74 in order to generate an analog signal representation of the key. In another as at step 71 the digital version of the key received from the CPU would be converted using appropriate digital to analog circuitry to an analog signal representation which would in turn be appropriately sampled. The key would then next be stored as a digital sample thereof as in step 70. Should a digital key be used, it is only necessary that the microprocessor 22 store the digital key as at step 76 in approximate matching unit 24. It should be understood that depending upon the particular structures desired to be included for each of the microprocessor 22 and approximate matching unit 24, the key may reside in either or all of these components, it merely being preferable to ultimately get the appropriate digital format for the key into the approximate matching unit 24 for comparison and correlation. Next, after the mass storage device reaches its starting location as at 79, the data stored on the mass storage medium 26 is continuously read as at step 78 to generate a continuous stream signal representative of the data stored in the mass storage medium 26. Should an analog key have been used, this analog key may then be correlated with an analog read of data from the mass storage medium 26 as at step 80. While the inventors contemplate that any of many prior art comparators and correlation circuitry could be used, for present purposes the inventors suggest that a digital sampling of the analog signal and key could be quite useful for performing such comparison and calculating the correlation coefficient, as explained below. It is noted that this analog signal generated from reading the data from mass storage medium 26 may be conveniently generated by devices in the prior art from the reading of either analog or digital data, it not being necessary that a digital key be used to match digital data as stored in mass storage medium 26. Alternatively, a correlation step 82 may be performed by matching the digital key with a stream of digital data as read from the mass storage medium 26. Note that the key reflects the inclusion of approximate information. Thus, correlating this with information read from the storage medium enables approximate matching capabilities.

Decision logic 84 would next make an intelligent decision as to whether a portion of data approximately matches or does not approximately match the key. Should a match be found, then the data is processed as at step 86 and the data requested by the query is sent to a disk cache 30, directly onto system bus 34, or otherwise be buffered or made available to a CPU 32, network interface 36, or otherwise as shown in FIGS. 1–4. A logical step 88 is suggested in FIG. 5 for returning to the continuous reading of data from the mass storage medium 26, indicating perhaps a "do" loop. However, it should be understood that this is a continuous process and that data is processed from the mass storage medium 26 as a stream and not in individualized chunks, frames, bytes, or other predetermined portions of data. While this is not precluded, the present invention preferably allows a key to be in essence "slid" over a continuously varying data read signal such that there is no hesitation in reading data from the mass storage medium 26. There is no requirement to synchronize reading to the start or end of any multi-bit data structure, or any other intermediate steps required to be performed as the data is compared continuously "on the fly" as it is read from the mass storage medium 26. This type of comparison and correlation may be referred to as a pattern match or comparison. Eventually, the data access is completed as at step 90 and the process completed.

The inventors herein have preliminarily tested the present invention and have generated preliminary data demonstrating its operability and effectiveness.

Figure 6:
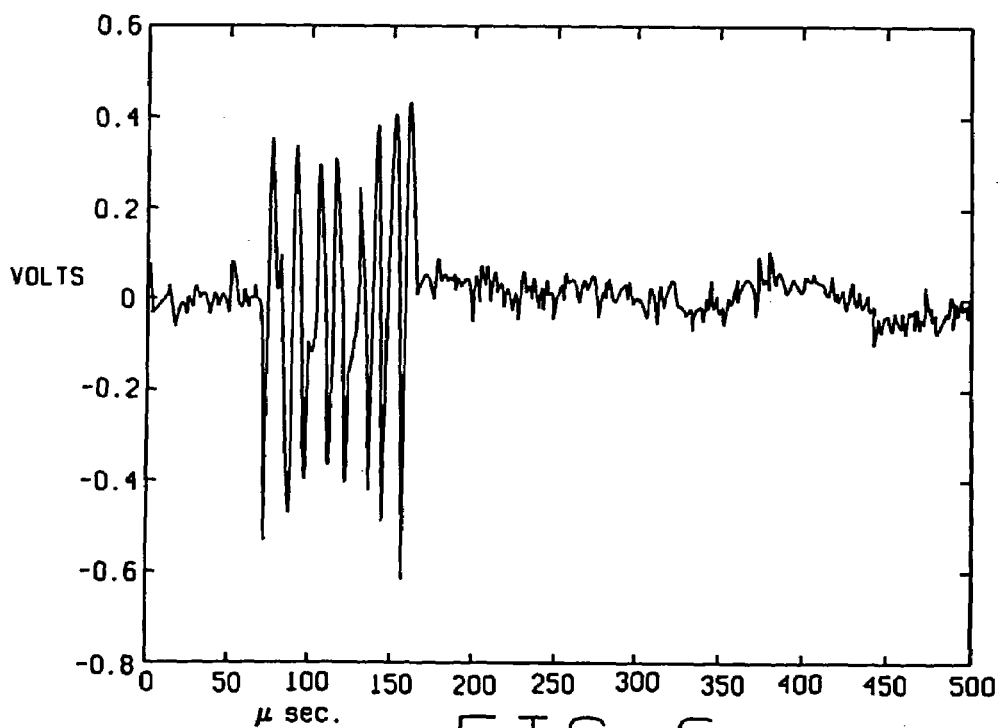
FIG. 6 is a graphical representation of an analog signal as might be used as a key.
Figure 7:
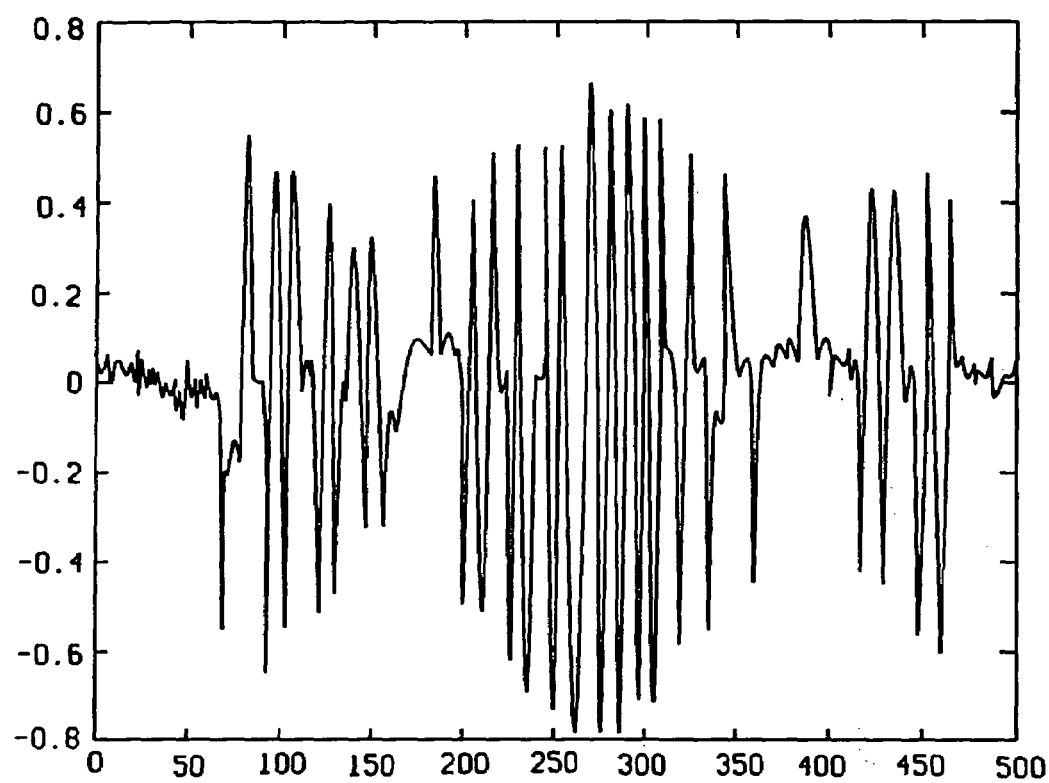
FIG. 7 is a graphical representation of an analog signal representing the continuous reading of data from a mass storage medium in which the "key" data pattern is present.

FIG. 6 is a graphical representation of a measured analog signal output from a read/write head as the read/write head reads a magnetic medium on which is stored a 10-bit digital key. As shown therein, there are peaks in an analog signal which, as known in the art, represents the true analog signal generated by a read/write head as data is read from a magnetic medium such as a hard disk. The scales shown in FIG. 6 are volts along the vertical axis and tenths of microseconds along the horizontal axis. As shown in FIG. 7, an analog signal is generated, again by a read/write head, as data is read from a pseudo-random binary sequence stored in a test portion of a magnetic medium. As can be seen in FIG. 7, the read signal does not provide an ideal square wave output when examined at this level.

Figure 8:
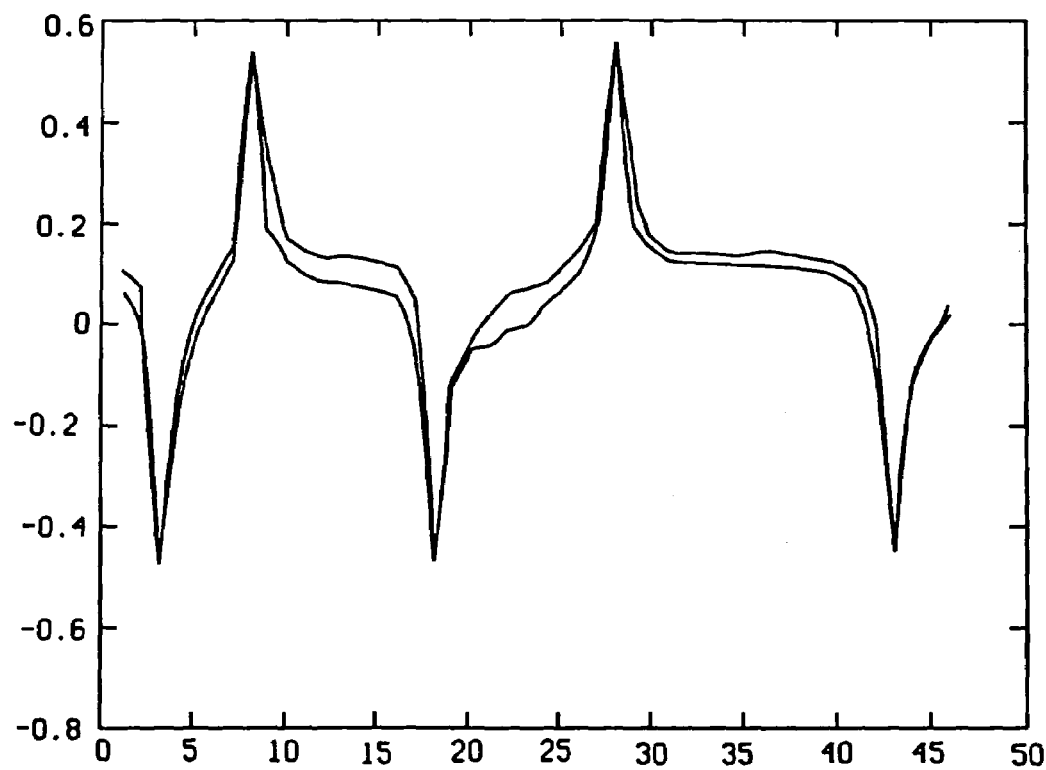
FIG. 8 is a graphical representation of the key signal overlying and matched to the data signal.

FIG. 8 is a graphical representation, with the horizontal scale expanded, to more specifically illustrate the overlap between approximately two bits of the 8-bit key and the corresponding two bits found in the pseudo-random binary sequence encoded at a different location on the disk or magnetic medium.

Figure 9:
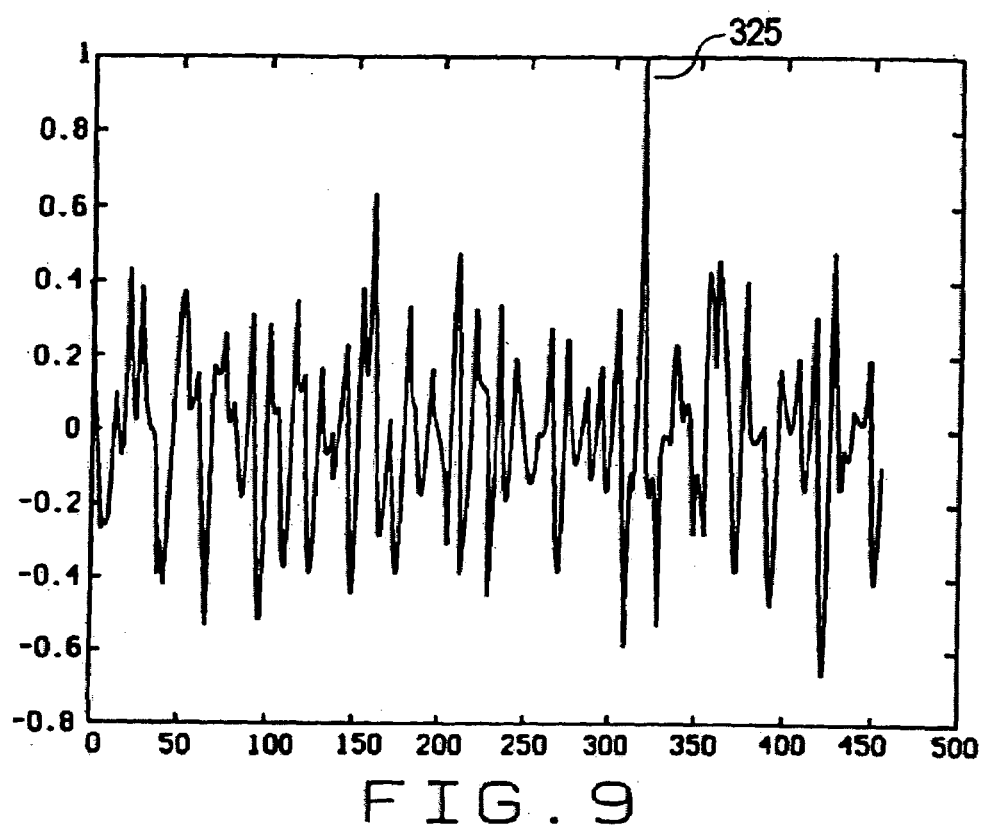
FIG. 9 is a graphical representation of a correlation function calculated continuously as the data in the mass storage medium is scanned and compared with the key.

FIG. 9 is a graphical representation of a correlation coefficient calculated continuously as the comparison is made between the key and the continuous reading of data from the hard disk. This correlation coefficient is calculated by sampling the analog signals at a high rate and using prior art signal processing correlation techniques. One such example may be found in Spatial Noise Phenomena of Longitudinal Magnetic Recording Media by Hoinville, Indeck and Muller, IEEE Transactions on Magnetics, Volume 28, no. 6, November 1992, the disclosure of which is incorporated herein by reference. A prior example of a reading, comparison, and coefficient calculation method and apparatus may be found in one or more of one of the co-inventor's prior patents such as U.S. Pat. No. 5,740,244, the disclosure of which is incorporated herein by reference. The foregoing represent examples of devices and methods which may be used to implement the present invention, however, as mentioned elsewhere herein, other similar devices and methods may be likewise used and the purposes of the invention fulfilled.

At approximately the point labeled 325, a distinct peak is noted which approaches 1, indicating a very close match between the key and the pseudo-random binary sequence. Thus, the present invention has been demonstrated as capable of finding a key that is present in a pseudo-random digital sequence. FIG. 9 is also illustrative of the opportunity for approximate matching which is believed to be a powerful aspect of the present invention. Looking closely at FIG. 9, it is noted that there are other lesser peaks that appear in the correlation coefficient. Thus, if a threshold of 0.4 were established as a decision point, then not only the peak occurring which approaches 1 would indicate a match or "hit" but also another five peaks would be indicative of a "hit". In this manner, a desired coefficient value may be predetermined or adjusted as desired to suit particular search parameters. For example, when searching for a particular word in a large body of text, lower correlation values may indicate the word is present but misspelled.

Figure 10:
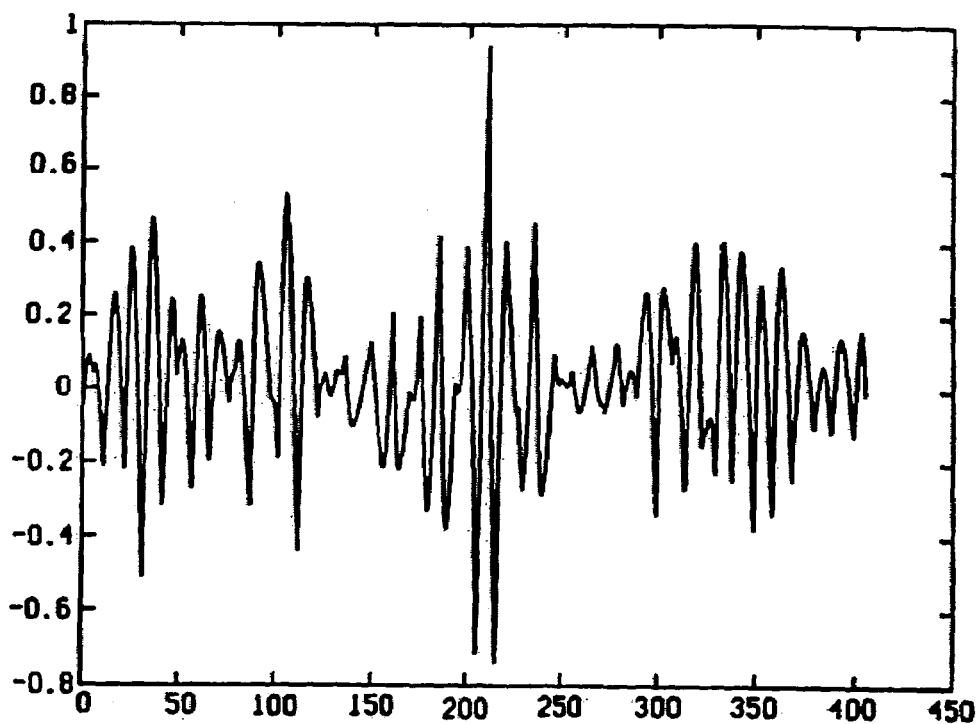
FIG. 10 is a graphical representation of a correlation function as the key is continuously compared with a signal taken from reading a different set of data but which also contains the "key" data pattern.

FIG. 10 depicts the continuous calculation of a correlation coefficient between the same 8-bit key but with a different data set. Again, a single match is picked up at approximately 200 microseconds. It is also noted that should a lower threshold be established additional hits would also be located in the pseudo-random data.

Various changes and modifications to the present invention would be apparent to those skilled in the art but yet which would not depart from the spirit of the invention. Several of these alternatives have been indicated above. For example, all of the operations exemplified by the analog processing shown in FIGS. 6–10, have their equivalent counterparts in the digital domain. Thus, approximate matching and correlation types of processing can be done on the standard digital representation of the analog bit patterns. This can also be achieved in a continuous fashion using tailored digital logic, microprocessors and digital signal processors, or alternative combinations. It is therefore the inventors' intention that the present invention be limited solely by the scope of the claims appended hereto, and their legal equivalents.

What is claimed is:

1. A data retrieval system comprising:
a mass storage medium in which data is stored;
a retrieval device in communication with the mass storage medium, wherein the retrieval device is configured to (1) receive a continuous stream of data from the mass storage medium, and (2) continuously process the data stream to determine whether an approximate match exists therein with respect to a key that is representative of data sought to be retrieved,
wherein the retrieval device is further configured to process the data stream to determine whether an approximate match exists via a pattern comparison between the key and the data stream,
wherein the key is an analog key and wherein the data stream is an analog data stream,
wherein the retrieval device is further configured to perform the pattern comparison by calculating a correlation coefficient that is indicative of a degree of correlation between the key and the data stream, and
wherein the retrieval device is further configured to determine that an approximate match exists if the correlation coefficient has a value larger than or at least equal to a predetermined threshold value.

2. The system of claim 1 wherein the threshold value is user-specified.

3. A data retrieval system comprising:
a mass storage medium in which data is stored; and
a retrieval device in communication with the mass storage medium, wherein the retrieval device is configured to (1) receive a continuous stream of data from the mass storage, and (2) process the data stream to determine whether an approximate match exists via a pattern comparison between the key and the data stream, wherein the retrieval device is further configured to perform the pattern comparison by calculating a correlation coefficient that is indicative of a degree of correlation between the key and the data stream, and wherein the retrieval device is further configured to determine that an approximate match exists if the correlation coefficient has a value larger than or at least equal to a predetermined threshold value.

4. The system of claim 3 wherein the threshold value is user-specified.

5. The system of claim 3 wherein the key is an analog key and wherein the data stream is an analog data stream.

6. The system of claim 3 wherein the key is a digital key and wherein the data stream is a digital data stream.

7. A retrieval device for retrieving data from a mass storage medium, said retrieval device comprising an approximate matching unit that is configured to framelessly perform a pattern comparison between a determined key representative of the data sought to be retrieved and a data signal representative of a continuous stream of data read from said mass storage medium, wherein said approximate matching unit is further configured to perform said pattern comparison by computing a correlation coefficient between said data key and said data signal, and wherein said approximate matching unit is further configured to compare said computed correlation coefficient with a predetermined threshold value to thereby determine whether an approximate match exists between said data key and said data signal.

8. The retrieval device of claims 7 wherein said predetermined threshold value is adjustable to control whether said approximate matching unit performs an approximate match operation or an exact match operation, and further to control, for an approximate match operation, a degree of approximate matches returned by said approximate match operation.

9. The retrieval device of claim 7 wherein said approximate matching unit comprises digital logic that is configured to framelessly perform said pattern comparison, wherein said data key is a digital data key and wherein said data signal is a digital data signal.

10. The retrieval device of claim 9 further comprising an approximate matching and pre-fetch processor, said approximate matching and pre-fetch processor comprising said approximate matching unit, wherein said approximate matching and pre-fetch processor is configured to generate said digital data signal by sampling a continuous stream of analog data read from said mass storage medium at a high rate.

11. The retrieval device of claim 10 wherein said approximate matching and pre-fetch processor is configured to generate said digital data key by sampling an analog key at a high rate.

12. The retrieval device of claim 10 wherein said predetermined threshold value is adjustable to control whether said approximate matching unit performs an approximate match operation or an exact match operation, and further control, for an approximate match operation, a degree of approximate matches returned by said approximate match operation.

13. The retrieval device of claim 10 wherein said approximate matching unit is implemented on a programmable logic device.

14. The retrieval device of claim 10 wherein said predetermined threshold value is adjustable to control whether said approximate matching unit performs an approximate match operation or an exact match operation, and further to control, for an approximate match operation, a degree of approximate matches returned by said approximate match operation.

15. The retrieval device of claim 9 further comprising a data path extending from said mass storage medium to a system bus, said data path comprising a digital decoder and said approximate matching unit, said digital decoder having an input and an output, said input being configured to receive a continuous stream of analog data that corresponds to data read from said mass storage medium, said output being in communication with said approximate matching unit.

16. The retrieval device of claim 15 further comprising a plurality of said paths connected in parallel between said mass storage medium and said system bus.

17. The retrieval device of claim 9 further comprising a data path extending from said mass storage medium to a system bus, said data path comprising a digital decoder, error correction circuitry, and said approximate matching unit, said digital decoder having an input and an output, said error correction circuitry having an input and an output, said digital decoder input being configured to receive a continuous stream of analog data that corresponds to data read from said mass storage medium, said digital decoder output being in communication with said error correction circuitry input, said error correction circuit output being in communication with said approximate matching unit.

18. The retrieval device of claim 17 further comprising a plurality of said paths connected in parallel between said mass storage medium and said system bus.

19. The retrieval device of claim 9 wherein said approximate matching unit is directly coupled to said mass storage medium and interfaces said mass storage medium with a processor desiring said retrieved data for processing thereof.

20. The retrieval device of claim 9 wherein said approximate matching unit is implemented on a programmable logic device.

21. The retrieval device of claim 7 wherein said approximate matching unit comprises analog circuitry that is configured to framelessly perform said pattern comparison, wherein said data key is an analog data key and wherein said data signal is an analog data signal.

22. The retrieval device of claim 21 further comprising an approximate matching and pre-fetch processor, said approximate matching and pre-fetch processor comprising said approximate matching unit, wherein said approximate matching and pre-fetch processor is configured to generate said analog data key from a digital data key.

23. The retrieval device of claim 21 wherein said predetermined threshold value is adjustable to control whether said approximate matching unit performs an approximate match operation or an exact match operation, and further to control, for an approximate match operation, a degree of approximate matches returned by said approximate match operation.

24. The retrieval device of claim 21 wherein said approximate matching unit is directly coupled to said mass storage medium and interfaces said mass storage medium with a processor desiring said retrieved data for processing thereof.

25. The retrieval device of claim 7 wherein said approximate matching unit is implemented on a programmable logic device.

26. The retrieval device of claim 7 wherein said approximate matching unit is directly coupled to said mass storage medium and interfaces said mass storage medium with a processor desiring said retrieved data for processing thereof.

27. A method for retrieving data from a mass storage medium, said method comprising the steps of:
receiving a search command from a processor for said mass storage medium,
determining a key representative of the data desired to be retrieved from said mass storage medium,
making a pattern comparison between said key and a data signal representative of a continuous stream of data read from said mass storage medium, said determined key being an analog key or a digital representation of an analog key, said data signal being an analog data signal or a digital representation of an analog data signal, wherein said data signal is said analog data signal if said key is said analog key, and wherein said data signal is said digital representation of said analog signal if said key is said digital representation of said analog key,
determining, in response to said pattern comparison, which data within said data signal matches said key; and
wherein said pattern comparison making step comprises computing a correlation coefficient between said key and said data signal, and wherein said match determining step comprises comparing said computed correlation coefficient with a predetermined threshold value to thereby determine whether a match exists between said data key and said data signal.

28. The method of claim 27 further comprising adjusting said predetermined threshold value to control whether said match determining step corresponds to an exact match operation or an approximate match operation.

29. The method of claim 27 wherein said key comprises said analog key and wherein said data signal comprises said analog data signal, and wherein said pattern comparison making step further comprises performing said pattern comparison making step with analog circuitry.

30. The method of claim 29 wherein the key determining step comprises generating said analog key from a digital key that is representative of the data desired to be retrieved from said mass storage medium.

31. The method of claim 27 further comprising reading data from said mass storage medium as a continuous analog data stream and sampling said continuous analog data stream at a high rate to thereby generate said digital representation of said analog data signal, and wherein said key determining step comprises sampling an analog key that is representative of the data desired to be retrieved from said mass storage medium at a high rate to thereby generate said digital representation of said analog key, and wherein said pattern comparison making step further comprises performing said pattern comparison making step with digital logic.

32. The method of claim 27 wherein said search command receiving step comprises receiving said search command from a remote processor over a network interface.

* * * * *